(12) United States Patent
Benke et al.

(10) Patent No.: US 10,157,211 B2
(45) Date of Patent: Dec. 18, 2018

(54) METHOD AND SYSTEM FOR SCORING DATA IN A DATABASE

(71) Applicant: INTERNATIONAL BUSINESS MACHINES CORPORATION, Armonk, NY (US)

(72) Inventors: Oliver Benke, Stuttgart (DE); Roland Seiffert, Herrenberg (DE); Jan-Bernd Themann, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 14/250,640

(22) Filed: Apr. 11, 2014

(65) Prior Publication Data

US 2014/0317046 A1 Oct. 23, 2014

(30) Foreign Application Priority Data

Apr. 23, 2013 (GB) .................................. 1307293.9

(51) Int. Cl.
*G06F 17/30* (2006.01)
(52) U.S. Cl.
CPC .............................. *G06F 17/30563* (2013.01)
(58) Field of Classification Search
CPC ................................................ G06F 17/30563
See application file for complete search history.

(56) References Cited

U.S. PATENT DOCUMENTS

| 7,437,662 B1* | 10/2008 | Yu ......................... G06F 17/227 707/999.001 |
| 2003/0177117 A1* | 9/2003 | Vishnubhotla .... G06F 17/30539 707/5 |
| 2005/0102292 A1* | 5/2005 | Tamayo ............ G06F 17/30539 707/10 |
| 2006/0294120 A1* | 12/2006 | Li ..................... G06F 17/30297 707/100 |

(Continued)

OTHER PUBLICATIONS

Thomsen et al., "ETLDiff: A Semi-automatic Framwork for Regression Test of ETL Software", 2006.*

(Continued)

*Primary Examiner* — Neveen Abel Jalil
*Assistant Examiner* — Dawaune Conyers
(74) *Attorney, Agent, or Firm* — Steven Chiu, Esq.; Kevin P. Radigan, Esq.; Heslin Rothenberg Farley & Mesiti P.C.

(57) ABSTRACT

Computer system and method are provided which include or utilize first and second databases, and a receiver for receiving online data. The first database stores received online data in a first data structure, and the second database stores the online data in a second data structure, with the second structure being obtained by applying a transformation to the online data in the first data structure. The system also has a software component for generating an analytical model using at least part of the online data stored in the second database, and a processor and memory storing a plurality of applications that are executable on the processor, where a mapping application includes instructions that, when executed, cause at runtime the processor to automatically retrieve at least part of the online data from the second database, and store in a storage of the system the retrieved online data.

20 Claims, 4 Drawing Sheets

(56) References Cited

U.S. PATENT DOCUMENTS

2008/0222059 A1* 9/2008 Baum-Waidner ...... G06Q 10/10
706/12
2009/0150447 A1* 6/2009 Anderson ......... G06F 17/30306
707/200
2012/0290527 A1* 11/2012 Yalamanchilli ... G06F 17/30592
707/602

OTHER PUBLICATIONS

Oracle, "Schema Integration Techniques for Building the ODS", 2013.*

* cited by examiner

METHOD AND SYSTEM FOR SCORING DATA IN A DATABASE

PRIOR FOREIGN APPLICATION

This application claims priority from United Kingdom patent application Serial No. GB 1307293.9, filed Apr. 23, 2013, which is hereby incorporated herein by reference in its entirety.

TECHNICAL FIELD

The invention relates to computing systems, and more particularly, to a method for scoring data in a database.

BACKGROUND

Database applications for online data processing are an important technology for different sized companies. The database applications can be classified into categories depending on the applications' requirements. Two category examples are the so-called On-Line Transaction Processing (OLTP) and Online Analytical Processing (OLAP) databases. The OLTP database may be used for real-time transaction processing and online scoring, with so-called OLTP schema. Such online scoring requires further improvements.

BRIEF SUMMARY

Briefly summarized, in one aspect, a computer system is provided which includes: a first database and a second database; a receiver for receiving online data, wherein the first database stores the received online data in a first data structure, and the second database stores the online data in a second data structure, wherein the online data in the second data structure are obtained by applying a transformation to the online data in the first data structure; a software component for generating an analytical model using at least part of the online data stored in the second database; and a processor, and memory, configured to store a plurality of applications that are executable on the processor, wherein a mapping application of the applications includes instructions that, when executed, cause at runtime the processor to automatically: retrieve and store the at least part of the online data from the second database in a storage of the computer system; generate probe data different from the data currently stored in the first database, wherein the probe data are stored in the storage in a third structure; write the probe data in the first database in the first data structure; apply the transformation on data stored in the first database; compare the at least part of the online data before and after the applying of the transformation for determining difference data; store in the storage the difference data in a fourth data structure; determine a data mapping between the data entries in the third data structure and the corresponding data entries in the fourth data structure; and use the determined data mapping to deploy the analytical model for scoring data to be stored in the first database based on the first data structure.

Computer-implemented methods and computer program products relating to one or more embodiments are also described and claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

In the following, embodiments of the invention will be described in greater detail by way of example only, making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
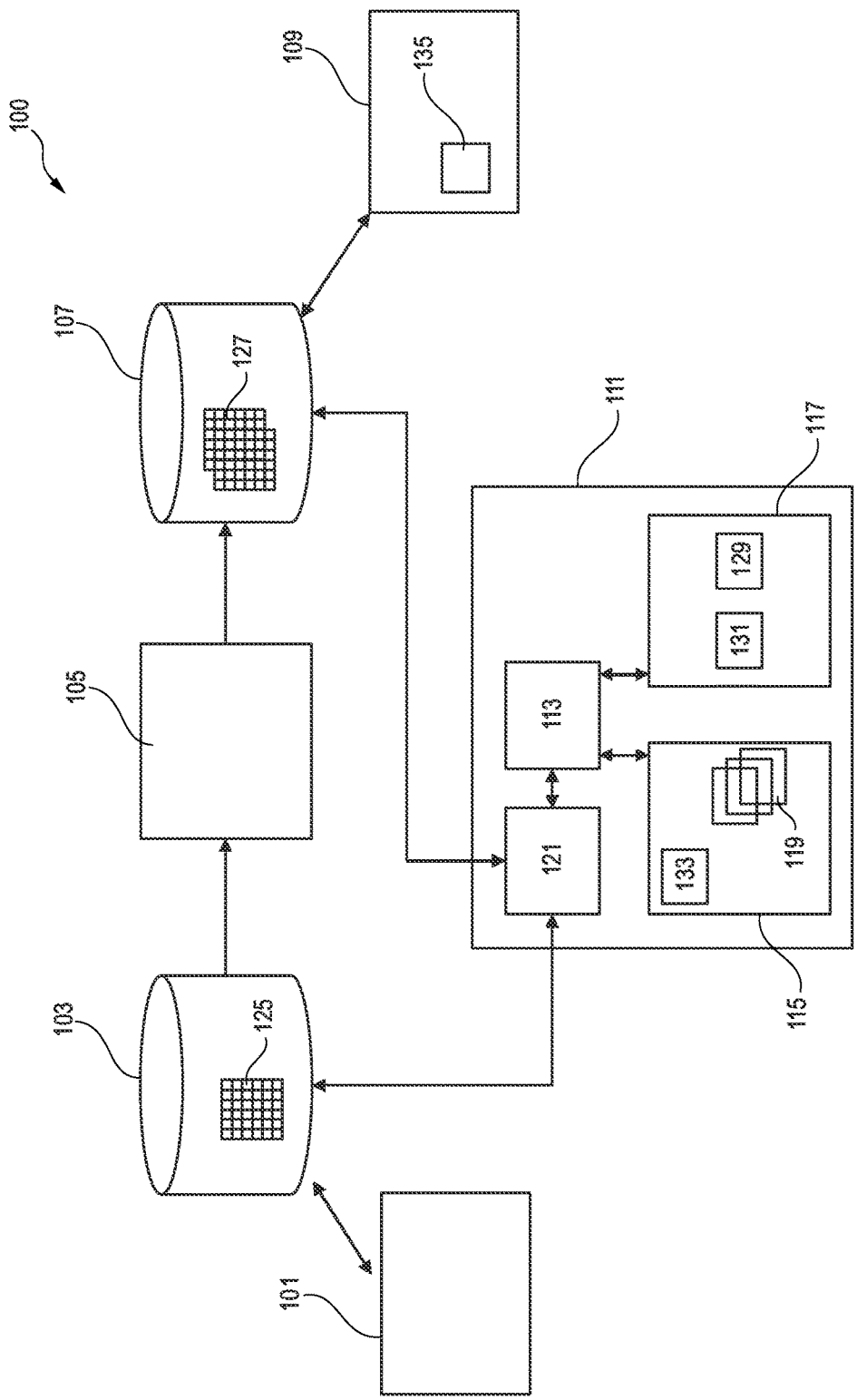
FIG. 1 shows a computing system architecture.

FIG. 1 shows a schematic view of a computing system 100. Computing system 100 is only one example of a suitable computing system and is not intended to suggest any limitation as to the scope of use or functionality of the invention described herein.

The computing system comprises an online transaction processing (OLTP) application server 101. The OLTP application server 101 is coupled to an operational data store 103. The operational data store 103 may be for example an Oracle database or an IBM's DB2. The operational data store 103 may be used for storing real-time transaction processing and online scoring data, with a so-called OLTP schema (that defines data structures) with which the data are stored in the operational data store 103 in a first data structure 125. The first data structure 125 may contain relational data in at least third normal form (3NF). The operational data store 103 may be a normalized relational database with limited redundancy.

Data (e.g. real time transactional data) may be transferred between the OLTP application server 101 and the operational data store 103 through an application programming interface (API). Operational data store 103 may receive data from multiple sources (via the OLTP server) and may provide a real-time access of current data.

ETL system 105 extracts the information from the operational data store 103, transforms and combines the data based on pre-defined constraints, and subsequently loads the data into an analytical data store 107. The ETL system 105 may use for example IBM's InfoSphere for data extraction. The predefined constraints may require for example a retrieval of data from the operational data store 103 if a required attribute value is not NULL, or only retrieving a subset of the properties of a given table. The transformations and combination may comprise the steps of normalization of mapping values to numbers; discretization by mapping continuous values to discrete values; value mapping by mapping values to different values; applying a given function to the data and an aggregation, similar to SQL GROUP BY statements.

The ETL transformation may be followed by an SPSS Stream that may define additional data transformation operations, including for example, aggregating and merging data, calculating time differences and calculating missing data values based on dedicated algorithms. The SPSS may use Control Language for Expression Modification (CLEM).

The data that are processed by the ETL system 105 and stored in the analytical data store 107 may be available for online analytical processing (OLAP) by an OLAP server 109. Said data are stored in a second data structure 127 that may be different from the first data structure 125. Said data may be used for example by a data mining workbench that is part of the OLAP server 109. Changes in the operational data store 105 are continuously uploaded (after applying ETL transformation) into the analytical data store 107.

The OLAP server 109 may comprise a modeler 135 such as a data mining workbench software that may generate from the data stored in the analytical data store 107 a scoring model which is used (in addition to a data mapping that maps the data stored in the operational data store to the analytical data store) for scoring the data to be stored in the operational data store 103. Scoring may be done for example by a z/OS DB2 in-database scoring UDFs. An alternative is a scoring engine running on a distributed server which may interpret models in standard Predictive Model Markup Language (PMML) notation and later on apply input values on the predictive model to compute the output score value.

The scoring model may be generated using at least part of online data stored in the analytical data store 107 using the PMML. The modeler 135 may have access to the at least part of online data of the analytical data store 107 that has been used in order to create the scoring or analytical model. For example, this subset of data (i.e. the at least part of online data) may be extracted from the analytical data store 107, using an existing network connection to the analytical data store 107 or the like. The subset of the analytical database to scan can be restricted to what is relevant for the analytical model in question, e.g. one or more tables used by the data mining workbench to create the model. The subset of data may comprise training data.

The computing system 100 further comprises a computer device 111. The computer device 111 is shown in the form of a general-purpose computing device. The components of computer device 111 may include, but are not limited to, one or more processors or processing units 113, a system memory 115 and a storage device 117. The processor's operation is controlled, in part, by information stored in the system memory 115, such as operating system software, application software 119, data, etc. The system memory 115 may include computer system readable media in the form of volatile memory, such as random access memory (RAM) and/or cache memory, a hard drive, etc.

Computer device 111 may also communicate (via a hardware interface 121) with the operational data store 103 and the analytical data store 107 via for example a remote data access method like Open Database Connectivity (ODBC) or Java Database Connectivity (JDBC). Alternatively, the computer device 111 may be connected to the operational and analytical data stores via a network, which may be a public network, such as the Internet, a private network, such as a wide area network (WAN), or a combination thereof.

The storage device 117 may comprise a set of prime numbers 129 which are not yet used (or stored) in the operational data store 103. It may further comprise a data variable 131 that contains the newest date currently used in the operational data store 103, or currently inserted in the operational data store 103.

The system memory 115 may comprise a data mapping application 133. The data mapping application 133 may check whether the data types required for the generation of the scoring model are compatible with the data types used in the operational data store 103. This may be done for example using the following correspondence table:

| PMML type | Matching SQL type |
| --- | --- |
| string | CHAR, VARCHAR |
| integer, float, double | INTEGER, FLOAT, DOUBLE, REAL, DECIMAL |
| boolean | BOOLEAN |
| date, time, dateTime, timeSeconds, dateDaysSince[], dateTimeSecondsSince [] | none |

For example, for the scoring model generation, decimal number may be treated as floats, as they are precise enough for the model building and faster than decimal arithmetic. So the data mapping application 133 may ignore such type changes as long as they match. The above correspondence table may be stored in the storage device 117.

In an exemplary operation, the computing system 100 enables to automatically insert probe or test data into the operational data store 103 and then to trigger and ETL transformation to update the content of the analytical data store 107 and to check how the probe data has been transferred, combined with delta calculation of element values before and after that update. For example, to automatically discover attribute name changes, computations and aggregations.

The operation of the computer system 100 will be described in details with reference to FIG. 2-4.

Figure 2:
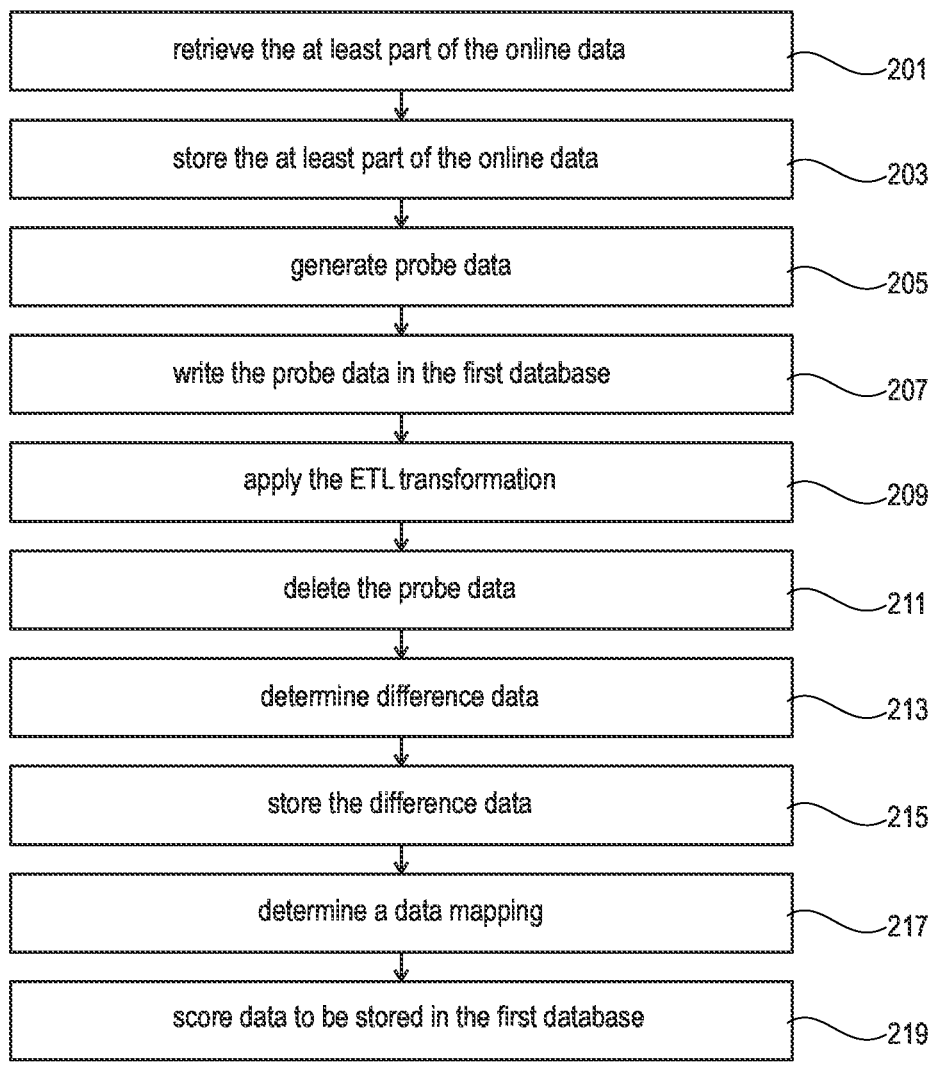
FIG. 2 is a flowchart of a method for scoring data to be stored in an operational data store.

FIG. 2 is a flowchart of a method for scoring data to be stored in the operational data store 103. In step 201 the at least part of the online data is retrieved from the analytical data store 107. The at least part of the online data may be for example a table of the second database. The online data may have different data types such as for example a numeric data type, string data type, date data type and the like.

In step 203, the retrieved at least part of the online data is stored in the storage device 117. This may be done for example by retrieving the computer file that is associated with the scoring model (e.g. PMML model file). This file may be parsed to get the required input attributes of the model such as the at least part of the online data. The at least part of the online data is stored in a data structure in which every entry comprises a key-value pair. The key corresponds to a value of an attribute of the entry. The value specifies a location of the attribute value within the data structure. The location may be for example a table, column, row identifier or a combination thereof. For example, if a value is found multiple times in the at least part of the online data, only one entry is added to the data structure (e.g. in case the at least part of the online data comprises two tables of the analytical data store 107 and the two tables have a same attribute value (e.g. customer ID) this duplicated attribute value may only be stored once). Also, for all date fields in the at least part of the online data, only the newest date is stored in said data structure. For example, for every column of the table the method may rank the date values that are stored in entries of that column and may select the highest date value as the newest date value. The reason for storing it this way is that it allows to store all relevant data in a very compact way, efficient to be looked up.

In step 205, probe data different from the data currently stored in the operational data store 103 are generated, wherein the probe data are stored in the storage device 117 in a third data structure. The third data structure comprises one or more entries each comprising a value of an attribute of said entry and a corresponding location within the first data structure.

The probe data are then written (inserted) in step 207 in the operational data store 101 in the first data structure. For every probe data value a corresponding attribute field (column) having the same data type as the data type of the probe data value may be used to insert in it the probe data value. If there are multiple tables with columns having the same data type one of them may be randomly chosen. Alternatively, the table that comprises maximum number of attributes or columns that correspond to the generated data types is chosen.

In step 209, the ETL transformation on data stored in the operational data store 103 is applied. This means that the inserted probe data are also transformed by the ETL transformation. In step 211, the probe data are deleted from the operational data store 101. This may be done for example by reading every entry of the third data structure for determining a location within the first database corresponding to an attribute value of the entry, and using the location for deleting the attribute value from the operational data store 103.

In step 213, a comparison of the at least part of the online data before and after said applying of the transformation is performed for determining difference data. In step 215, the difference data is stored in the storage device 117 in a fourth data structure. In step 217, a data mapping between data entries in the third data structure and their corresponding data entries in the fourth data structure is determined. In step 219, the determined data mapping is used to deploy the analytical model for scoring data to be stored in the operational data store based on the first data structure. Scoring function may have multiple output parameters, like a score and a probability that the score is correct.

The analytical database may be cleaned of the probe data-related data, by executing a second ETL transformation, similar to step 209, after step 215.

Figure 3:
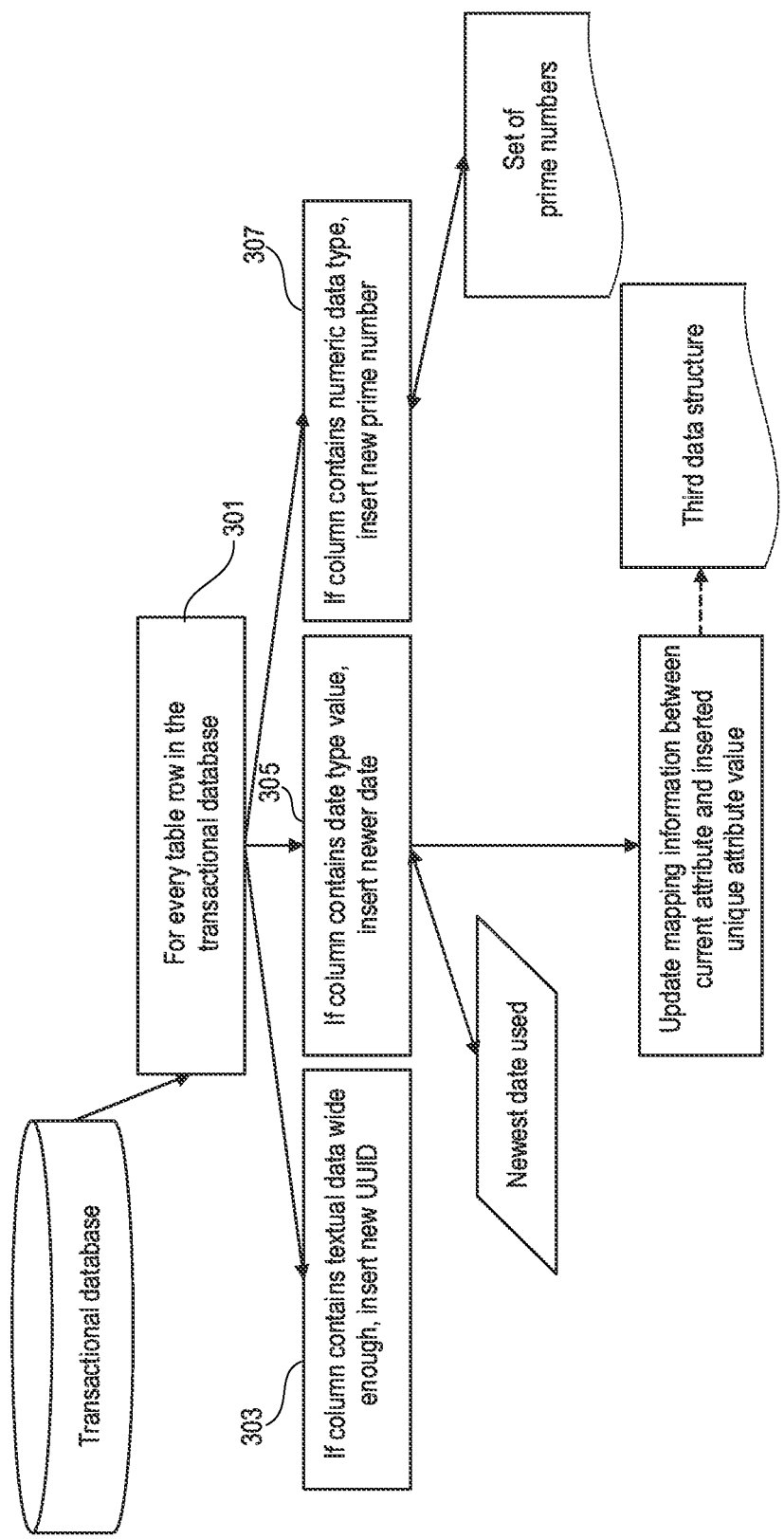
FIG. 3 is a flowchart of a method for generating probe data.

FIG. 3 is a flowchart of an exemplary method for generating the probe data. For every row 301 (e.g. associated with a row ID) of a given table in the operational data store 103, the mapping application 133 may check the data type of the values stored in a column associated with said row. This may be done for example by reading the value stored in an entry of said column, wherein the entry may be identified by a column ID of said column and the row ID of said row. If the data type 303 associated with said column is a string (e.g. char/varchar) data type, the mapping application 133 may insert a universally unique identifier (UUID) if there are enough characters to hold it. If there are not enough characters the mapping application 133 may either use another data type that is in the table or alternatively may choose another table of the operational data store 103.

If the data type 305 associated with said column is a date data type, the mapping application 133 may increment the newest data value that is assigned to the data variable value 131 and insert said incremented newest date value in the column (thereby adding a new row in the table).

If the data type 307 associated with said column is a numeric data type the mapping application 133 may insert a unique prime number out of set of prime numbers 129 and remove that number from the set of prime numbers 129. The data being inserted in the operational data store 103 may also be stored in the storage device 117 using the third data structure. The third data structure comprises one or more entries each comprising a value of an attribute of said entry and a corresponding location within the first data structure.

The insertion of the probe data values may also consider database constraints. Such constraints may be for example that attributes in the database cannot have NULL values. In this case, if a row of data is inserted, attributes which cannot have NULL values have to have values inserted (e.g. if a table has two attributes, customer ID and the name of the customer, when inserting a numeric value in the customer ID column (in a row), a unique string value such as UUID should also be inserted in the associated column name (in the row).

The constraints may also be referential integrity constraints, with the consequence that the key used to reference to a table actually exists in the table being referenced to—so inserting a row in one table requires that additional probe data is also inserted in related tables.

DB2 z/OS implements multiple protocols to allow applications to connect to it: DRDA, TSO, CAF, CICS attachment facility and IMS attachment interface. In a typical customer scenario, it is common that DRDA (with JDBC) is only used for distributed applications extracting the data for ETL/ELT steps to feed them into analytical databases or to use them for SPSS, whereas all production transactional work is based on host interfaces like CICS attachment facility. In this case, probe data may be added/inserted after receiving a request from the distributed application. This may have the advantages that the more important transactional workload (via other protocols than DRDA) may not see the inserted test or probe data. Inserted UUIDs can be easily used by Data Loss Prevention (DLP) applications at the edge of the companies network, or even within the company, as those inserted UUIDs can only be found in network packages if somebody tries to steal business data. Also, the cleanup ETL step may not be required as the data that are used to generate the analytical model may be deleted after creating said model.

Figure 4:
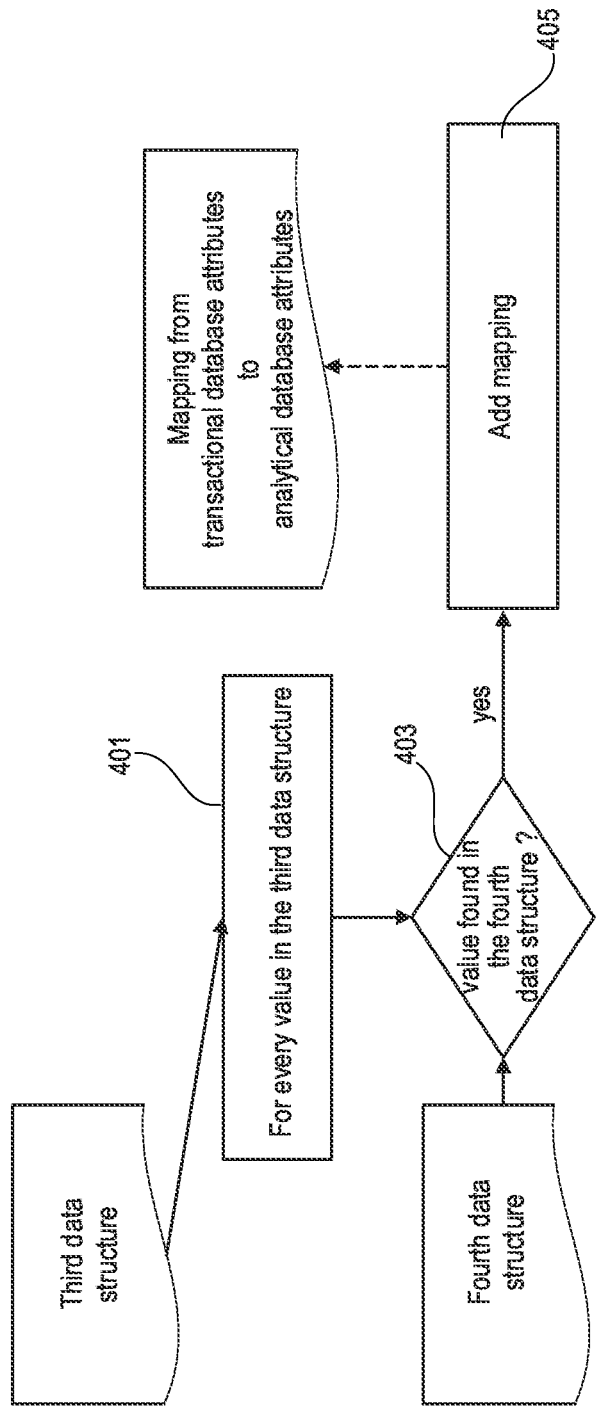
FIG. 4 is a flowchart of a method for determining a data mapping.

FIG. 4 is a flowchart of a method for determining the data mapping between data entries in the third data structure and their corresponding data entries in the fourth data structure. For every entry 401 of the third data structure, it is checked whether such data is part of the fourth data structure. If yes 403, a mapping 405 is found and stored to a specific data structure in the storage device 117.

For derived numeric values where multiple attribute values are multiplied, the mapping can be found based on factorization. For example, if the number 3511 has been added to X.price in the table of the operational data store 103 and the number 3571 has been added to Y.qty and if the number 12537781=3511*3571 has been found in attribute sales in the difference data, one knows that sales maps to X.price*Y.qty. Similarly, additions and subtractions may be detected.

The method may generate a number of probe data numeric values that is higher than a predetermined minimum number of numeric values. For example, the minimum number of numeric values may be set to a high value such that to avoid the case of a non-prime number which can be factorized into used input primes which is actually the result of a different calculation. The multiple probe data numerical values may be added for every attribute. Also when inserting the multiple probe data numerical values for every table row, aggregations might be discoverable as well.

In the following, a simplified example to visualize how the automatic discovery of a mapping from a transactional database (e.g. 103) to an analytical database (e.g. 107) works is given.

In this example, the transactional database contains tables RELTABA and RELTABB. Table RELTABA has attributes CustID (numeric, unique, primary key), RiskGroup (string data type) and Comment (string data type). Table RELTABB has attributes CustID (numeric, unique, primary key, foreign key referencing RELTABA.CustID) and Age (numeric).

Because of the meta-information found in the transactional database, the foreign-key relationship between RELTABA.CustID and RELTABB.CustID is known and exploited to correctly insert data new generated probe data values.

Table Contents Before Inserting Probe Data

Table RELTABA:

| CustID | RiskGroup | Comment |
|---|---|---|
| 1102 | Low | Free-text comment |

Table RELTABB:

| CustID | Age |
|---|---|
| 1102 | 25 |

Table ANATAB is a Table of the Analytical Database that is Obtained by Applying the ETL Transformations to the Tables RELTABA and RELTABB Before Inserting Probe Data:

| AttrA | AttrB | AttrC |
|---|---|---|
| Low | Free-text comment | 25 |

After inserting probe data in the tables RELTABA and RELTABB they become as follows:

| CustID | RiskGroup | Comment |
|---|---|---|
| 1102 | Low | Free-text comment |
| 1789 | 6bfe0102-9fff-1111-2222-00c04f123456 | 12fe0102-9fff-1111-2222-00c04f123478 |

The probe data are generated as follows: since CustID is a numeric type, a currently unused prime number is used (1789 in the example). RiskGroup and Comment are strings, so generated UUIDs are used.

Table RELTABB After Inserting Probe Data:

| CustID | Age |
|---|---|
| 1102 | 25 |
| 1789 | 2017 |

The probe data to be inserted in this table RELATABB are generated as follows: Age is a different numeric attribute, where a currently unused prime number—in the example, 2017—is inserted.

The probe data are also stored in a storage such as the storage device 117. The following table PROBETAB (e.g. the third data structure described above) contains the probe data:

| Value | Table column identifier in transactional database |
|---|---|
| 1789 | RELTABA.CustID, RELTABB.CustID |
| 6bfe0102-9fff-1111-2222-00c04f123456 | RELTABA.RiskGroup |
| 12fe0102-9fff-1111-2222-00c04f123478 | RELTABA.Comment |
| 2017 | RELTABB.Age |

After Running the ETL/ELT Procedure on Data Stored in the Transactional Database Including the Probe Data the Table ANATAB Becomes:

| AttrA | AttrB | AttrC |
|---|---|---|
| Low | Free-text comment | 25 |
| 6bfe0102-9fff-1111-2222-00c04f123456 | 12fe0102-9fff-1111-2222-00c04f123478 | 12fe0102-9fff-1111-2222-00c04f12347825 2017 |

Comparing the tables ANATAB before and after applying the ETL transformation on the content of the transactional database (including the probe data), the difference data may be obtained and represented in the following table DIFFTAB:

| Value | Table column identifier in analytical database |
|---|---|
| 6bfe0102-9fff-1111-2222-00c04f123456 | ANATAB.AttrA |
| 12fe0102-9fff-1111-2222-00c04f123478ANATAB.AttrB | ANATAB.AttrB |
| 2017 | ANATAB.AttrC |

The mapping application (e.g. 133) may then find the mapping by iterating over the PROBETAB data structure (comprising the probe data) and looking up values in the DIFFTAB accordingly, resulting in the following result for this example MAPTAB:

| Transactional database | Analytical database |
|---|---|
| RELTABA.RiskGroup | ANATAB.AttrA |
| RELTABA.Comment | ANATAB.AttrB |
| RELTABB.Age | ANATAB.AttrC |

In more complex scenarios, factorization may be used to detect arithmetic formulas used in the ETL process.

The used data mining workbench, which operates on the analytical database, might generate a scoring function like
DECTREE_Predict (ANATAB.AttrA, ANATAB.AttrB, ANATAB.AttrC)
with input parameters ANATAB.AttrA, ANATAB.AttrB, ANATAB.AttrC based on the analytical database content to generate a scoring model.

Using the automatically determined data mapping in the table MAPTAB above, it is possible to convert the scoring function invocation to:
DECTREE_Predict_Transactional (RELTABA.RiskGroup, RELTABA.Comment, RELTABB.Age)
making use of parameters based on transactional database table values RELTABA.RiskGroup, RELTABA.Comment, RELTABB.Age. Thus, this scoring function can be directly deployed in a way it uses the transactional database, without requiring e.g. external inputs to specify the mapping manually.

In case a data type may not be recognized by the mapping method used or data from an external database, not found in the transactional database, the found data mapping may be used as a base for a user to determine the complete data mapping, or the missing data can be added to the transactional database.

To summarize, it is an objective of embodiments of the invention to provide an improved computer-implemented method, a computer system and a computer program product. The objective is solved by the subject matter of the independent claims. Advantageous embodiments are described in the dependent claims.

The term "ELT" is the abbreviation for "Extract, Load, Transfer" while "ETL" stands for "Extract, Transfer, Load". The terms ELT and ETL may be used interchangeably in this document.

The term "data structure" as used herein refers to a particular way of storing and organizing data in a computer. It may be for example a table data structure having assigned a column specific attribute, comprising a set of column entries, whereby each column entry comprises a data value which is unique for said columnar data structure and which has been assigned to a corresponding 'record attribute' of one or more data records.

In one aspect, the invention relates to a computer system comprising a first database and a second database. The computer system further comprises a receiver for receiving online data. The first database stores the received online data in a first data structure. The second database stores the online data in a second data structure. The online data in the second structure are obtained by applying an ETL transformation to the online data in the first data structure. The data that are stored in the second database may be a snapshot of the online data stored in the first data base at a particular point in time during run time period of the computer system.

The computer system further comprises a software component for generating an analytical model using at least part of the online data stored in the second database. The computer system further comprises a processor, and memory configured to store a plurality of applications that are executable on the processor, wherein a mapping application of the applications includes instructions that, when executed cause at runtime the processor to automatically:
  retrieve the at least part of the online data from the second database;
  store in a storage of the computer system the retrieved at least part of the online data;
  generate probe data different from the data currently stored in the first database, wherein the probe data are stored in the storage in a third data structure;
  write the probe data in the first database in the first data structure;
  apply the ETL transformation on data stored in the first database. At this stage the data stored in the first database comprises the probe data;
  compare the at least part of the online data before and after said applying of the ETL transformation for determining difference data;
  store in the storage the difference data in a fourth data structure;
  determine a data mapping between data entries in the third data structure and their corresponding data entries in the fourth data structure;
  use the determined data mapping to deploy the analytical model for scoring data to be stored in the first database based on the first data structure.

The term "online data" as used herein refers to data that are provided/collected in a real-time or online data collection, analysis and storage.

The scoring may comprise applying the analytical (or predictive) model to new data to be stored in the first database, such as to perform predictions or segmentations.

The at least part of the online data may be stored in a data substructure of the second data structure. This data substructure may be for example one or more tables. The comparison of the at least part of the online data before and after applying of the ETL transformation may be performed by comparing the content of the data substructure before and after applying the ETL transformation (e.g. by locating the one or more tables and determining how the entries change in said tables.)

The second data structure may be OLAP data structures such as data cubes, star schemas, snowflake schemas, other multidimensional data structures and the like, in addition to materialized views and other techniques used to increase performance of the data mining algorithms applied on analytical databases.

The second data structure may be different from the first data structure.

These features may be advantageous as they may provide an automatic method for determining a mapping between two database structures which may enable an autonomous/independent function of the computer system. This is in contrast to the conventional systems where the mapping is determined ad-hoc, based on inputs from a user of the computing system.

For example, at least part of the data mapping may be automatically determined, wherein the at least part of the data mapping may be sent to a user of the computing system. The computing system may receive the whole data mapping that is determined based on the at least part of the data mapping.

Another advantage may be that these features may provide an accurate data mapping and thus a reliable scoring of data to be stored in the first database.

According to one embodiment, the at least part of the online data is stored in a data structure corresponding to the fourth data structure, wherein an entry of said data structure comprises a key-value pair, wherein the key corresponds to a value of an attribute of that entry, wherein the value specifies a location of the attribute value within the data structure.

This may be advantageous as it may provide an open-ended data structure that may allow for future extension without modifying existing code or data. For example, the data mapping may be determined in another point in time at which the analytical model is generated using an additional data set to the at least part of the online data. In this case, the existing data structure may still be used and extended to include the additional data set.

The fact that the data structure corresponds to the fourth data structure that comprises the difference data may facilitate and fasten the process of the storage of the difference data. This is due to the fact that it may save time and calculations that would otherwise be required for mapping the entries of the data structure with a different data structure than the fourth data structure.

In another example, the fourth data structure may be different from the third data structure.

According to one embodiment, the third data structure comprises one or more entries each comprising a value of an attribute of said entry and a corresponding location within the first data structure, wherein the fourth data structure has structure that corresponds to the third data structure, wherein the determination of the data mapping comprises for each first entry of the fourth data structure: reading said first entry of the fourth data structure; determining corresponding one or more second entries in the third data structure; determining a mapping between the first and one or more second entries.

For example, in case an entry value in the fourth data structure is derived from more than one entry of the third data structure (e.g. as a result of a multiplication in the ETL transformation), a factorization method may be used for the mapping. This may be done by a decomposition of the derived value into a product of the more than one entry.

The term "location" as used herein refers to one or more identifiers for locating an entry within a data structure. It may be for example a table number, column number, row number or a combination thereof and the like. It may also comprise a unique key such as to make use of the concept of the unique key in relational databases to identify rows.

According to one embodiment, the execution of the instructions further causes the processor to delete the probe data from the first database, wherein the third data structure comprises one or more entries each comprising a value of an attribute of said entry and a corresponding location within the first data structure, wherein the deletion of the probe data comprises reading an entry of the third data structure for determining a location within the first database corresponding to an attribute value of the entry; using the location for deleting the attribute value from the first database. This may provide an efficient and fast method for deleting previously inserted probe data in the first database. The fact that the location of such probe data within the first database is also stored in the third data structure may prevent complicated search operations of probe data (e.g. using their values only) within the first database.

According to one embodiment, the execution of the instructions further causes the processor to delete the probe data from the first database, wherein the deletion of the probe data further comprises applying the transformation on data stored in the first database after the deletion.

This may be advantageous as it may free up the computer system and in particular the second database from (transformed) probe data that are already used and not required anymore.

According to one embodiment, the probe data comprises unique data.

According to one embodiment, the probe data comprises a plurality of data types, wherein the probe data comprises unique data selected from the group comprising a non-stored prime number for numeric data types, a unique date value for date data type and a unique string value for string data type.

According to one embodiment, the generating comprises defining a unique date variable, wherein the date variable value comprises the newest date value stored in the first database, incrementing the newest date value for obtaining a probe date value, assigning the probe date value to the variable value and repeating the incrementing and assigning steps for generating at least part of the probe data.

These embodiments may provide a reliable data mapping method, as they may avoid using redundant data as probe data which may lead to a wrong data mapping.

According to one embodiment, the storage of the at least part of the online data comprises storing a single attribute value of redundant attribute values and a newest date value of date values of the at least part of the real time data.

This may allow to store all relevant data in a compact way that is efficient to be looked up.

According to one embodiment, the retrieval is performed using a remote data access method comprising one of an Open Database Connectivity (ODBC) and Java Database Connectivity (JDBC).

According to one embodiment, the first database is an OLTP database and the second database is an OLAP database.

According to one embodiment, the mapping application is part of an OLTP server that manages the OLAP database or part of an OLAP server that manages the OLAP database. The mapping application may also be part of a separate computer device. The receiver is part of the OLTP server.

In another aspect, the invention relates to a computer implemented method in a computer system comprising a first database and a second database, the computer system comprising a receiver for receiving online data, wherein the first database stores the received online data in a first data structure, wherein the second database stores the online data in a second data structure, wherein the online data in the second structure are obtained by applying an ETL transformation to the online data in the first data structure, the computer system further comprising a software component for generating an analytical model using at least part of the online data stored in the second database, the method comprising automatically:

retrieving the at least part of the online data from the second database;
  storing in a storage of the computer system the retrieved at least part of the online data;
  generating probe data different from the data currently stored in the first database, wherein the probe data are stored in the storage in a third data structure;
  writing the probe data in the first database in the first data structure;
  applying the ETL transformation on data stored in the first database;
  comparing the at least part of the online data before and after said applying of the ETL transformation for determining difference data;
  storing in the storage the difference data in a fourth data structure;
  determining a data mapping between data entries in the third data structure and their corresponding data entries in the fourth data structure;
  using the determined data mapping to deploy the analytical model for scoring data to be stored in the first database based on the first data structure.

In another aspect, the invention relates to a computer program product comprising computer executable instructions to perform the method steps of the method of the preceding embodiments.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire-line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A computer system comprising:
a first database and a second database, the first database being a transactional database comprising an operational data store and the second database being an analytical database comprising an analytical data store;
a receiver for receiving online data, wherein the first database stores the received online data in a first data structure, and the second database stores transformed online data in a second data structure, wherein the transformed online data in the second structure are obtained by applying a transformation to the online data in the first data structure;
a software component for generating an analytical data model using at least part of the transformed online data stored in the second database;
a processor, and memory configured to store a plurality of applications that are executable by the processor, wherein a mapping application of the applications facilitates applying the analytical data model generated using the at least part of the transformed online data stored in the second database to the online data in the first database, the mapping application including instructions that, when executed cause at runtime the processor to automatically:
retrieve and store the at least part of the transformed online data from the second database in a storage of the computer system;
generate test probe data of a data type value different from the received online data currently stored in the first database, the test probe data being selected from the group comprising a non-stored prime number for numeric data types, a unique date value for date data types, and a unique string value for string data types, wherein the test probe data are stored in the storage in a third data structure;
write the test probe data into the first database in the first data structure;
based on writing the test probe data into the first database in the first data structure, further apply the transformation on the data stored in the first database, including the test probe data, to obtain transformed test probe data in the second data structure;
compare test probe data in the first data structure and the transformed test probe data in the second data structure to determine data which facilitates determining how the test probe data moved between the first and second data structures as a result of the further applying of the transformation;
store in the storage the data based on the compare in a fourth data structure;
determine a data mapping, resulting from the transformation, using the test probe data entries in the third data structure and corresponding data entries in the fourth data structure, the data mapping identifying one or more attribute name changes, computations, or aggregations occurring on the test probe data in the second data structure based on the further applying of the transformation; and
use the determined data mapping in deploying the analytical model, generated using at least part of the transformed online data stored in the second database, the deploying including using the data mapping and the analytical model to facilitate evaluating new data to be stored in the first transactional database.

2. The computer system of claim 1, wherein the at least part of the transformed online data is stored in a data structure corresponding to the fourth data structure, wherein an entry of the data structure comprises a key-value pair, wherein the key corresponds to a value of an attribute of that entry, wherein the value specifies a location of the attribute value within the data structure.

3. The computer system of claim 1, wherein the third data structure comprises one or more entries each comprising a value of an attribute of the entry and a corresponding location within the first data structure, wherein the fourth data structure has structure that corresponds to the third data structure, wherein the determination of the data mapping comprises for each first entry of the fourth data structure:
reading the first entry of the fourth data structure;
determining corresponding one or more second entries in the third data structure; and
determining a mapping between the first and one or more second entries.

4. The computer system of claim 1, wherein the execution of the instructions further causes the processor to delete the test probe data from the first database, wherein the third data structure comprises one or more entries each comprising a value of an attribute of the entry and a corresponding location within the first data structure, wherein the deletion of the test probe data comprises:
reading an entry of the third data structure for determining a location within the first database corresponding to an attribute value of the entry; and
using the location for deleting the attribute value from the first database.

5. The computer system of claim 1, wherein the execution of the instructions further causes the processor to delete the test probe data from the first database, wherein the deletion of the test probe data further comprises applying the transformation on data stored in the first database after the deletion.

6. The computer system of claim 1, wherein the test probe data comprises unique data.

7. The computer system of claim 1, wherein the test probe data comprises a plurality of data types, wherein the test probe data comprises unique data selected from the group comprising a non-stored prime number for numeric data types, a unique date value for date data type and a unique string value for string data type.

8. The computer system of claim 1, wherein the generating comprises defining a unique date variable, wherein the date variable value comprises the newest date value stored in the first database, incrementing the newest date value for obtaining a probe date value, assigning the probe date value to the variable value and repeating the incrementing and assigning steps for generating at least part of the test probe data.

9. The computer system of claim 1, wherein the storage of the at least part of the transformed online data comprises storing a single attribute value of redundant attribute values and a newest date value of date values of the at least part of the real time data.

10. The computer system of claim 1, wherein the retrieval is performed using a remote data access method comprising one of an Open Database Connectivity (ODBC) and Java Database Connectivity (JDBC).

11. The computer system of claim 1, wherein the first database is an on-line transaction processing (OLTP) database and the second database is an on-line analytic processing (OLAP) database.

12. The computer system of claim 11, wherein the mapping application is part of an OLTP server that manages the OLAP database or part of an OLAP server that manages the OLAP database, wherein the receiver is part of the OLTP server.

13. A computer-implemented method for processing data in a database of a computer system, the method comprising automatically:

retrieving and storing at least part of transformed online data from a storage of the computer system, the computer system comprising a first database and a second database, the first database being an operational data store and the second database being an analytical data store, the computer system further comprising a receiver for receiving online data, wherein the first database is a transactional database that stores the received online data in a first data structure, and the second database is an analytical database that stores transformed online data in a second data structure, and wherein the transformed online data in the second structure are obtained by applying a transformation to the online data in the first data structure, the retrieving and storing the at least part of the transformed online data being from the second database in the storage of the computer system, the computer system further comprising a software component for generating an analytical model using at least part of the transformed online data stored in the second database, the method facilitating applying the analytical data model generated using the at least part of the transformed online data stored in the second database to the online data in the first database, the retrieving and storing the at least part of the transformed online data being from the second database in the storage of the computer system;

generating test probe data of a data type value different from the received online data currently stored in the first database, the test probe data being selected from the group comprising a non-stored prime number for numeric data types, a unique date value for date data types, and a unique string value for string data types, wherein the test probe data are stored in the storage in a third data structure;

writing the test probe data into the first database in the first data structure;

based on writing the test probe data into the first database in the first data structure, further apply the transformation on the data stored in the first database, including the test probe data, to obtain transformed test probe data in the second data structure;

compare test probe data in the first data structure and the transformed test probe data in the second data structure to determine data which facilitates determining how the test probe data moved between the first and second data structures as a result of the further applying of the transformation;

store in the storage the data based on the compare in a fourth data structure;

determine a data mapping, resulting from the transformation, using the test probe data entries in the third data structure and corresponding data entries in the fourth data structure, the data mapping identifying one or more attribute name changes, computations, or aggregations occurring on the test probe data in the second data structure based on the further applying of the transformation; and use the determined data mapping in deploying the analytical model, generated using at least part of the transformed online data stored in the second database, the deploying including using the data mapping and the analytical model to facilitate evaluating new data to be stored in the first database of the first data structure.

14. A computer program product for processing data in a database of a computer system, the computer program product comprising:

a computer-readable storage medium readable by a processor and storing instructions for execution by the processor for performing a method comprising automatically:

retrieving and storing at least part of transformed online data from a storage of the computer system, the computer system comprising a first database and a second database, the first database being a transactional database comprising an operational data store and the second database being an analytical database comprising an analytical data store, a receiver for receiving online data, wherein the first database stores the received online data in a first data structure, and the second database stores transformed online data in a second data structure, the transformed online data in the second structure being obtained by applying a transformation to the online data in the first data structure, the retrieving and storing the at last part of the transformed online data being from the second database in the storage of the computer system, the computer system further including a software component for generating an analytical data model using at least part of the transformed online data stored in the second database, and a plurality of applications that are executable on the processor, including a mapping application which facilitates applying the analytical data model generated using the at least part of the transformed online data store in the second database to the online data in the first database, the retrieving and storing the at least part of the transformed online data being from the second database in the storage of the computer;

generating test probe data of a data type value different from the received online data currently stored in the first database, the test probe data being selected from the group comprising a non-stored prime number for numeric data types, a unique date value for date data types, and a unique string value for string data types, wherein the test probe data are stored in the storage in a third data structure;

writing the test probe data into the first database in the first data structure;

based on writing the test probe data into the first database in the first data structure, further applying the transformation on data stored in the first database, including the test probe data, to obtain transformed test probe data in the second data structure;

compare test probe data in the first data structure and the transformed test probe data in the second data structure to determine data which facilitates determining how the test probe data moved between the first and second data structures as a result of the further applying of the transformation;

store in the storage the data based on the compare in a fourth data structure;

determine a data mapping, resulting from the transformation, using the test probe data entries in the third data structure and corresponding data entries in the fourth data structure, the data mapping identifying one or more attribute name changes, computations, or aggregations occurring on the test probe data in the second data structure based on the further applying of the transformation; and use the determined data mapping in deploying the analytical model, generated using at least part of the transformed online data stored in the second database, the deploying including using the data mapping and the analytical model to facilitate evaluating new data to be stored in the first database of the first data structure.

15. The computer-implemented method of claim 13, wherein the test probe data comprises unique data.

16. The computer-implemented method of claim 13, wherein the test probe data comprises a plurality of data types, wherein the test probe data comprises unique data selected from the group comprising a non-stored prime number for numeric data types, a unique date value for date data type and a unique string value for string data type.

17. The computer-implemented method of claim 13, wherein the first database is an on-line transaction processing (OLTP) database and the second database is an on-line analytic processing (OLAP) database.

18. The computer program product of claim 14, wherein the test probe data comprises unique data.

19. The computer program product of claim 14, wherein the test probe data comprises a plurality of data types, wherein the test probe data comprises unique data selected from the group comprising a non-stored prime number for numeric data types, a unique date value for date data type and a unique string value for string data type.

20. The computer program product of claim 14, wherein the first database is an on-line transaction processing (OLTP) database and the second database is an on-line analytic processing (OLAP) database.

* * * * *